United States Patent Office 3,637,645
Patented Jan. 25, 1972

3,637,645
WATER-SOLUBLE PYRAZALINE DISAZO DYE-STUFFS AND METAL COMPLEX COMPOUNDS THEREOF
Fritz Meininger and Hermann Fuchs, Frankfurt am Main, Germany, assignors to Farbwerke Hoechst Aktiengesellschaft vormals Meister Lucius & Bruning, Frankfurt am Main, Germany
No Drawing. Filed Sept. 6, 1968, Ser. No. 758,105
Claims priority, application Germany, Sept. 9, 1967, P 16 44 228.7
Int. Cl. C09b *31/14, 45/24;* D06p *1/10*
U.S. Cl. 260—147                                6 Claims

ABSTRACT OF THE DISCLOSURE

Water-soluble disazo-dyestuffs having in form of the free acid the formula

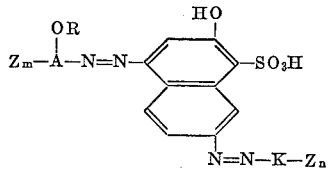

in which Z represents —SO$_2$—CH=CH$_2$,

—SO$_2$—CH$_2$—CH$_2$—O—SO$_3$H

—SO$_2$—CH$_2$—CH$_2$—O—SO$_3$—CH$_3$

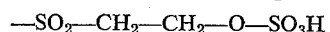

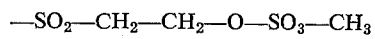

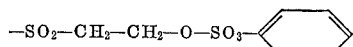

—SO$_2$—CH$_2$—CH$_2$—N (lower alkyl)$_2$ or

—SO$_2$—CH$_2$—CH$_2$—Cl

R represents hydrogen or lower alkyl, m and n represent integers from 0 to 2, the sum of m and n being at least 1 and at most 2, A represents the radical of a diazo component of the benzene and naphthalene series, and K represents the radical of a coupling component of the naphthalene, pyrazolone and aceto-acetylarylamide series, and the 1:1 copper complex compound or the 1:2-cobalt- or 1:2-chromium complex compounds thereof, said dyestuffs being suitable for the dyeing or printing of fibrous materials of native or regenerated cellulose, wool, silk, polyamides or polyurethanes, the dyeings and prints obtained on cellulose fibrous materials being of intense red-brown, dark brown, olive, grey (black) or navy blue shades and being distinguished by a very good fastness to light and to wet processing.

---

The present invention relates to novel valuable water-soluble disazo dyestuffs which, in the form of the free acids, correspond to the general formula

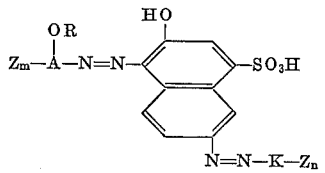

in which A represents an aryl radical of the benzene or naphthalene series, wherein the —OR— group is linked in ortho position to the azo bridge, K represents the radical of a coupling component of the benzene, naphthalene, pyrazolone or acetylacetaryl amide series, Z represents a grouping of the formula

—SO$_2$—CH$_2$—CH$_2$—X      (2)

in which X represents an inorganic or organic group that can be split off by alkaline agents, or of the formula

—SO$_2$—CH=CH$_2$      (3)

R represents a hydrogen atom or a lower alkyl group, and m and n represent an interger from 0 to 2, the sum of m and n being at least 1 and at most 2, and the copper, cobalt or chromium complex compounds thereof.

More particularly, in the general Formula 1, Z represents —SO$_2$—CH=CH$_2$, —SO$_2$CH$_2$—CH$_2$—O—SO$_3$H,

—SO$_2$—CH$_2$—CH$_2$—O—SO$_3$—CH$_3$

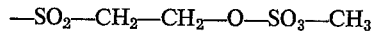

—SO$_2$—CH$_2$—CH$_2$—S—SO$_3$H

—SO$_2$—CH$_2$—CH$_2$—S—SO$_3$H, —SO$_2$—CH$_2$—CH$_2$—O—C—CH$_3$
                                                                    ‖
                                                                    O

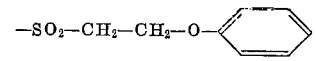

—SO$_2$—CH$_2$—CH$_2$—N (lower alkyl)$_2$ or

—SO$_2$—CH$_2$—CH$_2$—Cl

R represents hydrogen or lower alkyl, m and n represent integers from 0 to 2, the sum of m and n being at least 1 and at most 2, A represents phenylene, lower alkyl-phenylene, lower alkoxy-phenylene, sulfophenylene, lower alkyl-lower alkoxy-phenylene, di(lower alkyl)phenylene, dinitro-phenylene,

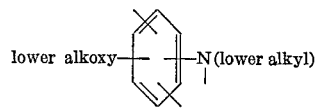

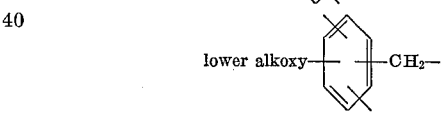

or lower alkoxy-sulfo-naphthylene, K represents hydroxy-monosulfo - naphthylene, hydroxy - disulfo - naphthylene, hydroxy - amino - disulfo - naphthylene, hydroxy - acetyl-aminodisulfonaphthylene,

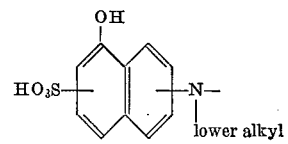

1-phenyl-3-lower alkyl-5-pyrazolone,
1-(sulfophenyl)-3-lower alkyl-5-pyrazolone,
1-phenyl-3-carboxy-5-pyrazolone,
1(sulfophenyl)-3-carboxy-5-pyrazolone,
1-(disulfo-phenyl)-3-carboxy-pyrazolone,
1-(chloromonosulfo-phenyl)-3-lower alkyl-5-pyrazolone,
1-(chloro-monosulfo-phenyl)-3-carboxy-5-pyrazolone,
1-(dichloro-monosulfo-phenyl)-3-lower alkyl-5-pyrazolone,
1-[N-(α-sulfoacetylamino)-phenyl]-3-lower alkyl-5-pyrazolone,
1-(lower alkylchloro-monosulfo-phenyl)-3-lower alkyl-5-pyrazolone,
1-(disulfo-naphthyl)-3-lower alkyl-5-pyrazolone,
acetoacetylamino-monosulfo-phenyl,
acetoacetylaminodisulfo-phenyl,
acetoacetylamino-phenyl, acetoacetylamino-di(lower alkoxyl)-phenyl or

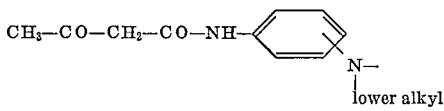

and the 1:1 copper complex compound or the 1:2-cobalt- or 1:2-chromium complex compound thereof.

We have found that the novel disazo dyestuffs which, in the form of the free acids, correspond to the aforementioned general Formula 1 can be prepared:

(a) By coupling monoazo dyestuffs of the general Formula 4

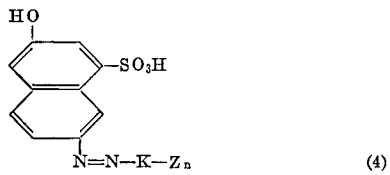

with diazo compounds of amines of the general Formula 5

$$Z_m-A-NH_2 \quad (5)$$

in which A, Z, $m$ and R are defined as above, and the —OR— group is linked in ortho position to the amino group, in a pH range of from about 4.0 to about 10.0, preferably about 6.5 to about 7.5, at temperatures of from about 0° C. to about 25° C., or (b) By diazotizing in usual manner monoazo dyestuffs of the general Formula 6

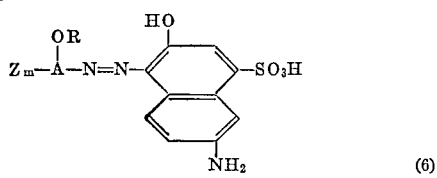

in which Z, $m$ and R are defined as above, and the —OR— group is linked in ortho position to the amino group, and coupling them in a pH range of from about 6.0 to about 8.0 at temperatures of from about 0° to about 25° C. with coupling components K having the above meaning.

The grouping Z may be directly linked to an aromatic nucleus of the coupling component K or to radical A or by means of a bridge member, for example a —CH$_2$— group, a —NH— group or a

group, wherein R' represents a lower alkyl group.

The disazo dyestuffs of the general Formula 1 are converted into the corresponding metal complex dyestuffs of the general Formula 7

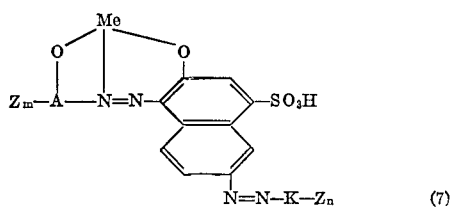

in which A, K, Z, $m$ and $n$ are specified as above, and Me represents Cu, Co/2 or Cr/2, in usual manner in the case of 1:1-copper complex compounds, for example by dealkylating coppering, and the conversion into the 2:1-chromium or 2:1-cobalt complex compounds is effected by chromating or cobalting the metal-free disazo dyestuffs or copper complex dyestuffs by means of chromium- or cobalt-yielding agents. As agents that yield chromium or cobalt there are mentioned all chromium or cobalt salts of inorganic or organic acids.

The non-metallized and metallized disazo dyestuffs are separated from the reaction solution by means of sodium or potassium chloride or mixtures thereof or they are isolated by evaporating or spray-drying the dyestuff solution.

The monoazo dyestuffs of the general Formula 4 are obtained by diazotizing 6 - amino-2-naphthol-4-sulfonic acid and coupling with coupling components K—Z$_n$ of the benzene, naphthalene, pyrazolone and acetoacetarylamide series, wherein Z and $n$ are defined as above, in the case of $n$ being 0, in a pH range of from about 4.0 to about 10.0, in the case of $n$ being 1 or 2, preferably in a pH range of from about 4.0 to about 8.0, at temperatures of from about 0° to about 25° C. In contrast to the preparation of isomeric dyestuffs by means of 2-diazo-8-naphthol-3,6 - disulfonic acid, 2-diazo-8-naphthol-6-sulfonic acid or 2-diazo-5-naphthol-7-sulfonic acid disclosed in Belgian Pat. Nos. 686,099, 686,104 and 686,538, the present invention has the advantage that 6-diazo-2-naphthol-4-sulfonic acid does not couple with itself in the course of neutralization with alkaline agents so that the monoazo dyestuffs of the general Formula 4 can be uniformly obtained in a simpler manner. The monoazo dyestuffs of the general Formula 6 are prepared by coupling diazotized amines of the general Formula 5 with 6-amino-2-naphthol-4-sulfonic acid, in the case of $m$ being 0, at a pH-value of more than 7.0, in the case of $m$ being 1 or 2, preferably in a pH range of from about 7.0 to about 8.5, if desired in the presence of from 5 to 30% by volume of pyridine at temperatures of from about 0° to about 25° C.

The amines of the general Formula 5 may contain one or several further substituents, for example the sulfonic acid group, the sulfonic acid amide group, the carboxy or carboxylic amide group, the nitro group and halogen atoms, for example chlorine or bromine; alkyl groups such as the methyl or ethyl group; alkoxy groups such as the methoxy or ethoxy group; or an acylamino group, for example the acetylamino group.

In Formula 2 the groups X which can be split off by alkaline agents may be acyloxy- and aryloxy groups, for example the acetoxy or phenoxy group; N-dialkylamino groups such as the N-dimethyl- or N - diethylamino group; alkyl- and arylsulfonic acid ester groups such, for example, as the methyl-sulfonic acid ester group or the benzene-sulfonic acid ester group; halogen atoms, in particular chlorine; the thio-sulfuric acid ester group and, preferably the sulfuric acid ester group. The metal-containing disazo dyestuffs obtainable according to the invention have a molar ratio of metal to disazo dyestuff of 1:1 in the case of copper complex compounds, and of 1:2 in the case of cobalt and chromium complex compounds.

The novel metal-containing disazo dyestuffs of the invention are excellently suitable for dyeing and printing wool, silk, polyamide and polyurethane fibers, especially natural or regenerated cellulose fibers. For this purpose, they are applied to textile materials made of the specified fibers by a dyeing or printing method usual for reactive dyestuffs and are fixed at normal or elevated temperature while treating them with an acid-binding agent prior to, during or after the use of the dyestuff. The metal-containing disazo dyestuffs obtainable according to the invention yield on cellulose materials color-intense dyeings and prints that are very fast to light and wet processing, the tint of which may be red-brown, dark brown, olive, grey (black) or navy-blue, depending on the chosen coupling components K—Z$_n$ and substituents in the aryl nucleus A of the general Formula 1. In contrast to dyeings produced with the comparable dyestuffs disclosed in Belgian Pats. Nos. 686,099, 686,104 and 686,538, the dyeings obtained with the dyestuffs of the invention possess a better fastness to wet processing due to a chemical homogeneity of the dyestuffs.

The following examples serve to illustrate the present invention, but they are not intended to limit it thereto, the parts being by weight unless stated otherwise.

EXAMPLE 1

(a) 23.9 parts of 6-amino-2-naphthol-4-sulfonic acid were dissolved in 150 parts by volume of water with 5.3 parts of anhydrous sodium carbonate and 20 parts by volume of a 5 N-sodium nitrite solution were added thereto. This mixture was run, while carefully stirring, into a mixture of 150 parts of ice and 25 parts of a 37% strength hydrochloric acid, a temperature of from 5 to 10° C. being maintained. To the diazo suspension a solution of 31.9 parts of 1-amino-8-naphthol-2,4-disulfonic acid and 5.3 parts of anhydrous sodium carbonate in 200 parts by volume of water was added and the pH-value was maintained within a range of from 5.0 to 6.5 during the coupling reaction. The final dyestuffs were salted out with 150 grams of sodium chloride per liter of solution volume, filtered and washed.

(b) 31.1 parts of 1-amino-2-methoxybenzene-5-β-hydroxyethylsulfone-sulfuric acid ester were dissolved in 150 parts by volume of water with 5.3 parts of anhydrous sodium carbonate and 20 parts by volume of a 5 N-sodium nitrite solution were added thereto. This solution was run, while carefully stirring, into 150 parts of ice and 25 parts of a 37% strength hydrochloric acid at a temperature of from 5 to 10° C. The pH-value of the diazo solution was adjusted to 5.0 by adding a 2 N-sodium carbonate solution which was also used for maintaining the pH within a range of from 6.5 to 7.5 while slowly adding the dyestuff obtained according to method (a) which had been stirred into 500 parts by volume of water. Coupling was complete after 2 hours and the disazo dyestuff separated after addition of 250 grams of potassium chloride per liter of solution volume. After filtration the residue was introduced into a filtered acetic-acid solution of copper acetate prepared by dissolving 19.5 parts of copper carbonate with 48 parts of glacial acetic acid in 500 parts by volume of water. The mixture obtained was heated while stirring for several hours to 90–95° C. until the copper complex compound had formed. The mixture was then clarified with kieselguhr and the copper complex disazo dyestuff of the formula

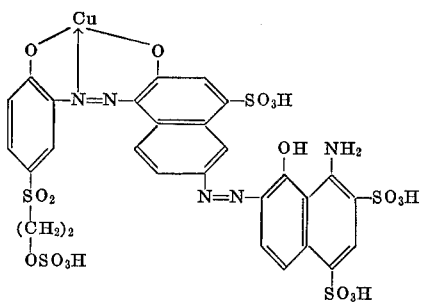

was salted out with 250 grams of potassium chloride per liter of solution volume.

The dyestuff obtained yielded on cotton, in the presence of sodium hydroxide, reddish blue dyeings and prints having very good fastness properties to light and wet processing.

EXAMPLE 2

A solution having a temperature of 60° C. and consisting of the copper complex disazo dyestuff of Example 1(b) in 500 parts by volume of water was added while vigorously stirring to a solution having the same temperature and consisting of 15.0 parts of crystallized oxalic acid in 150 parts by volume of water and after stirring for 10 minutes 12.5 parts of crystallized chromium (III)-chloride and 40 parts of crystallized sodium acetate were added thereto and the mixture was stirred for 7 to 8 hours at 90–95° C. The chromium complex disazo dyestuff of the formula

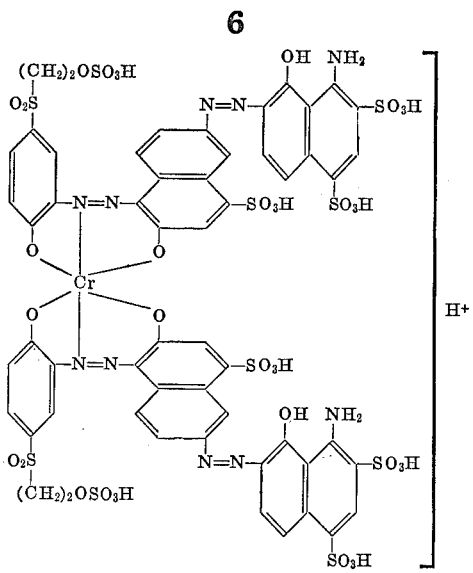

was precipitated by adding 200 grams of potassium chloride per liter of solution volume and separated by filtration. The navy-blue dyeing produced on wool or polyamide showed very good fastness properties to light and wet processing.

EXAMPLE 3

(a) 23.9 parts of 6-amino-2-naphthol-4-sulfonic acid were diazotized as in Example 1(a). To the diazo suspension a neutral solution of 25.4 parts of 1-(4'-sulfophenyl)-3-methyl-pyrazolone-5 in 150 parts by volume of water was added while carefully stirring and the pH of the solution was maintained within a range of from 4.5 to 5.5 during the coupling reaction by adding a 2 N-sodium carbonate solution; towards the end of coupling, the pH was adjusted to 6.5. After stirring had been continued for 3 hours, the monoazo dyestuff was salted out with 200 grams of sodium chloride per liter of solution volume and filtered.

(b) The moist filter residue was dissolved in 500 parts by volume of water and the solution was run into a diazo solution prepared from 34.1 parts of 1 amino-2,5-dimethoxybenzene-4-β-hydroxyethyl-sulfone-sulfuric acid ester in 250 parts by volume of water. During the coupling reaction the pH was adjusted to 6.5–7.5 by adding a 2 N-sodium carbonate solution. Coupling was complete after 2 hours. The disazo dyestuff was precipitated by adding 200 grams of potassium chloride per liter of solution volume, it was filtered with suction and the filter residue was introduced into a solution of copper acetate prepared by dissolving 19.5 parts of copper carbonate with 48 parts of glacial acetic acid in 500 parts by volume of water and the mixture was stirred for 16 hours at 90–95° C. until a complete demethylating coppering was achieved. Subsequently the dyestuff solution was clarified with kieselguhr and the copper complex disazo dyestuff was salted out with 150 grams of potassium chloride per liter of solution volume.

The dyestuff of the formula

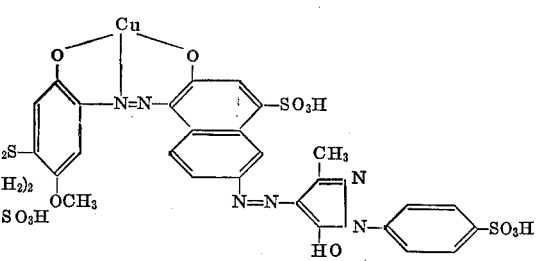

dyed cotton and regenerated cellulose olive green tints in the presence of sodium hydroxide. The dyeings had very good fastness properties to light and wet processing.

EXAMPLE 4

(a) 23.9 parts of 6-amino-2-naphthol-4-sulfonic acid were diazotized as in Example 1(a) and the diazo suspension was combined with a neutral solution of 28.4 parts of 1 - (4' - sulfophenyl)-3-carboxy-pyrazolone - 5 in 150 parts by volume of water. During the coupling reaction the pH was maintained within the range of from 4.5 to 5.5 and towards the end it was adjusted to 6.5. After 3 hours the dyestuff was precipitated with 200 grams of sodium chloride per liter of solution volume and filtered.

(b) The moist dyestuff of Example 4(a) stirred into 500 parts by volume of water was added to a diazo solution prepared from 32.5 parts of 1-amino-2-methoxy-5-methyl-benzene-4-β-hydroxyethyl-sulfone-sulfuric acid ester in 250 parts by volume of water. Coupling proceeded smoothly within 2 hours in a pH range of from 6.5 to 7.5. The disazo dyestuff was separated from the solution with 200 grams of potassium chloride per liter of solution volume and filtered. The moist filter residue was introduced into a solution of 40 parts of crystallized copper sulfate, 43.6 parts of crystallized sodium acetate and 30 parts of glacial acetic acid in 500 parts by volume of water and the mixture was stirred for several hours at 90-95° C. until the demethylating coppering was complete. After clarification of the solution with active carbon, the copper complex disazo dyestuff of the formula

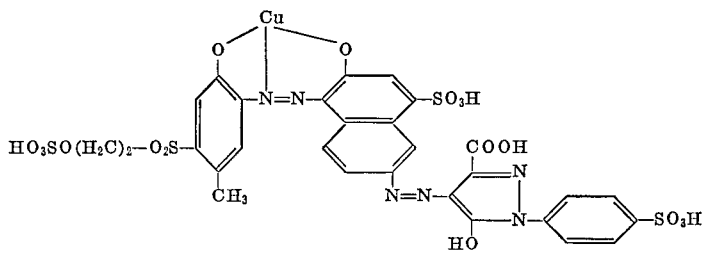

was precipitated with 200 grams of potassium chloride per liter of solution volume.

The dark-brown dyeings and prints on cotton and regenerated cellulose in the presence of alkali were very fast to light and wet processing.

EXAMPLE 5

A solution having a temperature of 60° C. and consisting of the copper complex disazo dyestuff of Example 4(b) in 500 parts by volume of water was added while vigorously stirring to a solution having the same temperature and consisting of 15.0 parts of crystallized oxalic acid in 150 parts by volume of water and after stirring for 10 minutes 14.1 parts of crystallized cobalt sulfate and 40 parts of crystallized sodium acetate were added thereto and stirred for 7 to 8 hours at 90-95° C. The cobalt complex disazo dyestuff of the formula was precipitated by adding 200 grams of potassium chloride per liter of solution volume and filtered.

The dyeing produced on wool or polyamide from an acetic acid bath showed a very good fastness to light and wet processing.

EXAMPLE 6

(a) 23.9 parts of 6-amino-2-naphthol-4-sulfonic acid were indirectly diazotized as in Example 1(a) and a neutral solution of 36.2 parts of 1-(4'-β-hydroxyethyl-sulfonylphenyl)-3-methyl-pyrazolone-5-sulfuric acid ester in 200 parts by volume of water was added to the diazo suspension and the mixture was coupled within a pH range of from 4.5 to 5.5. Towards the end of the reaction the pH was adjusted to 6.5 by adding a 2 N-sodium carbonate solution. After stirring had been continued for 4 hours the monoazo dyestuff was salted out with 200 grams of potassium chloride per liter of solution volume and filtered.

(b) 20.3 parts of 2-amino-anisol-4-sulfonic acid were dissolved with 5.3 parts of anhydrous sodium carbonate in 150 parts by volume of water until neutral reaction occurred, the solution was combined with 20 parts by volume of a 5 N-sodium nitrite solution and added to a mixture of 150 parts of ice and 25 parts of a 37% strength by weight hydrochloric acid. To this diazo solution the monoazo dyestuff according to (a) suspended in 300 parts by volume of water was added and during the coupling reaction the pH of the solution was maintained within a range of from 6.5 to 7.5. After 3 hours coupling was complete; the disazo dyestuff was precipitated with 200 grams of potassium chloride per liter of solution volume and after filtration it was stirred into a solution of copper acetate prepared from 19.5 parts of copper carbonate of 52.3% strength, 48 parts of glacial acetic acid and 500 parts by volume of water and the mixture was heated to 90-95° C. for several hours. The copper complex disazo dyestuff of the formula

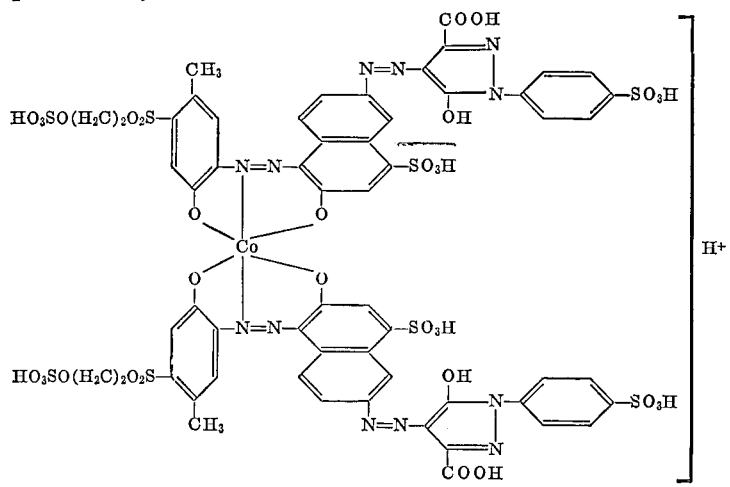

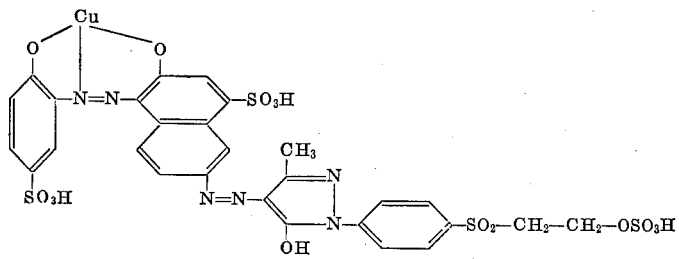

was salted out with 200 grams of potassium chloride per liter of solution volume.

The brown dyeing produced on cotton in the presence of alkali had good fastness properties to light and wet processing.

EXAMPLE 7

(a) The same copper complex disazo dyestuff as in Example 6 was obtained by diazotizing 20.3 parts of 2-amino-anisol-4-sulfonic acid as in Example 6(b), adjusting the pH of the diazo solution to 7.5 with a 2 N-sodium carbonate solution and slowly adding 23.9 parts of 6-amino-2-naphthol-4-sulfonic acid that had been dissolved to neutral with 5.3 parts of anhydrous sodium carbonate in 150 parts by volume of water, while maintaining the pH-value within a range of from 7.5 to 8.5.

(b) When coupling was complete, 7.0 parts of sodium nitrite were added to the solution of the monoazo dyestuff and the mixture was run into 150 parts of ice and 25 parts of a 37% strength hydrochloric acid. 30.2 parts of 1-(4'-β-hydroxyethyl-sulfonyl-phenyl) - 3 - methyl-pyrazolone-5-sulfuric acid ester in 200 parts by volume of water were added to this diazo solution and during the coupling reaction the pH was maintained within a range of from 6.5 to 7.5. The disazo dyestuff was converted into the copper complex disazo dyestuff in the manner disclosed in Example 6(b).

The following table comprises further examples carried out according to the process described in Examples 1 to 7.

TABLE

| No. | Diazo component of the general Formula 5 | Coupling component K of the general Formulae 1 or 4 | Complex metal | Tint on cotton or wool |
|---|---|---|---|---|
| 8 | 1-amino-2-methoxy-5-methyl-benzene-4-β-hydroxyethylsulfone-sulfuric acid ester. | 1-amino-8-naphthol-2,4-disulfonic acid | Cu | Navy-blue. |
| 9 | do | do | Co | Do. |
| 10 | do | do | Cr | Blue-grey. |
| 11 | 1-amino-2-methoxybenzene-5-β-hydroxyethylsulfone-sulfuric acid ester. | do | Co | Navy-blue. |
| 12 | 1-amino-2,5-dimethoxybenzene-4-β-hydroxyethylsulfone-sulfuric acid ester. | do | Cu | Do. |
| 13 | do | do | Co | Do. |
| 14 | do | do | Cr | Blue-grey. |
| 15 | 1-amino-2-methoxybenzene-5-β-hydroxyethylsulfone-sulfuric acid ester | 1-amino-8-naphthol-3,6-disulfonic acid | Cu | Navy-blue. |
| 16 | do | do | Cr | Do. |
| 17 | 1-amino-2-methoxy-5-methylbenzene-4-β-hydroxyethylsulfone-sulfuric acid ester. | do | Cu | Do. |
| 18 | do | do | Co | Do. |
| 19 | do | do | Cr | Do. |
| 20 | 1-amino-2,5-dimethoxybenzene-4-β-hydroxyethylsulfone-sulfuric acid ester. | do | Cu | Do. |
| 21 | do | do | Co | Do. |
| 22 | do | do | Cr | Blue-grey. |
| 23 | 1-amino-2-methoxybenzene-5-β-hydroxyethylsulfone-sulfuric acid ester. | 1-amino-8-naphthol-4,6-disulfonic acid | Cu | Navy-blue. |
| 24 | 1-amino-2-methoxy-5-methylbenzene-4-β-hydroxyethylsulfone-sulfuric acid ester. | do | Cu | Do. |
| 25 | 1-amino-2,5-dimethoxybenzene-4-β-hydroxyethylsulfone-sulfuric acid ester. | do | Cu | Do. |
| 26 | 1-amino-2-methoxybenzene-5-β-hydroxyethylsulfone-sulfuric acid ester | 1-acetamino-8-napthol-3,6-disulfonic acid | Cu | Do. |
| 27 | do | do | Co | Do. |
| 28 | do | do | Cr | Do. |
| 29 | 1-amino-β-methoxy-5-methylbenzene-4-β-hydroxyethylsulfone-sulfuric acid ester. | do | Cu | Do. |
| 30 | do | do | Cr | Do. |
| 31 | 1-amino-2,5-dimethoxybenzene-4-β-hydroxy-ethylsulfone-sulfuric acid ester. | do | Cu | Do. |
| 32 | do | do | Cr | Blue-grey. |
| 33 | 1-amino-2-methoxy-5-methylbenzene-4-β-hydroxyethylsulfone-sulfuric acid ester. | 1-(4'-sulfophenyl)-3-methyl-pyrazolone-5 | Cu | Dark brown. |
| 34 | do | do | Co | Do. |
| 35 | do | do | Cr | Do. |
| 36 | 1-amino-2,5-dimethoxybenzene-4-β-hydroxyethylsulfone-sulfuric acid ester. | do | Co | Olive. |
| 37 | do | do | Cr | Do. |
| 38 | 1-amino-2-methoxybenzene-5-β-hydroxyethylsulfone-sulfuric acid ester. | do | Cu | Brown. |
| 39 | do | do | Co | Do. |
| 40 | do | do | Cr | Do. |
| 41 | do | 1-(4'-sulfophenyl)-3-carboxy-pyrazolone-5 | Cu | Do. |
| 42 | do | do | Co | Do. |
| 43 | do | do | Cr | Do. |
| 44 | 1-amino-2-methoxy-5-methylbenzene-4-β-hydroxyethylsulfone-sulfuric acid ester. | do | Cr | Dark brown. |
| 45 | 1-amino-2,5-dimethoxybenzene-4-β-hydroxyethylsulfone-sulfuric acid ester. | do | Cu | Grey. |
| 46 | do | do | Co | Do. |
| 47 | do | do | Cr | Do. |
| 48 | 1-amino-2-methoxybenzene-5-β-hydroxyethylsulfone-sulfuric acid ester. | 1-(2',5'-disulfophenyl)-3-carboxy-pyrazolone-5 | Cu | Red brown. |
| 49 | 1-amino-2-methoxy-5-methylbenzene-4-β-hydroxyethylsulfone-sulfuric acid ester. | do | Cu | Bordo. |
| 50 | 1-amino-2,5-dimethoxybenzene-4-β-hydroxyethylsulfone-sulfuric acid ester. | do | Cu | Grey. |
| 51 | do | 1-(4'-β-hydroxyethylsulfonyl-phenyl)-3-methyl-pyrazolone-5-sulfuric acid ester. | Cu | Do. |
| 52 | do | do | Cr | Do. |

TABLE—Continued

| No. | Diazo component of the general Formula 3 | Coupling component K of the general Formulae 1 or 4 | Complex metal | Tint on cotton or wool |
|---|---|---|---|---|
| 53 | 1-amino-2,5-dimethoxybenzene-4-sulfonic acid | 1-(4'-β-hydroxyethylsulfonyl-phenyl)-3-methyl-pyrazolone-5-sulfuric acid ester. | Cu | Dark brown. |
| 54 | 1-amino-2-methoxy-5-methylbenzene-4-sulfonic acid | do | Cu | Do. |
| 55 | 1-amino-2-methoxy-5-methylbenzene-4-β-hydroxyethylsulfone-sulfuric acid ester. | do | Cu | Do. |
| 56 | do | do | Cr | Do. |
| 57 | 1-amino-2-methoxybenzene-5-β-hydroxyethylsulfone-sulfuric acid ester. | do | Cu | Brown. |
| 58 | do | do | Cr | Do. |
| 59 | 1-amino-2,5-dimethoxybenzene-4-β-hydroxyethylsulfone-sulfuric acid ester. | 1-acetoacetaminobenzene-4-sulfonic acid | Cu | Olive. |
| 60 | 1-amino-2-methoxybenzene-5-β-hydroxyethylbenzene-sulfuric acid ester. | do | Cu | Brown. |
| 61 | 1-amino-2,5-dimethoxybenzene-4-β-hydroxyethylsulfone-sulfuric acid ester. | 1-acetoacetaminobenzene-3,5-disulfonic acid | Cu | Olive. |
| 62 | 1-amino-2-methoxy-5-methylbenzene-4-β-hydroxyethylsulfone-sulfuric acid ester. | do | Cu | Brown. |
| 63 | 1-amino-2-methoxy-benzene-5-β-hydroxyethylsulfone-sulfuric acid ester. | 1-(2',5'-dichloro-4'-sulfophenyl)-3-methyl-pyrazolone-5. | Cu | Do. |
| 64 | 1-amino-2,5-dimethoxybenzene-4-β-hydroxyethylsulfone-sulfuric acid ester. | do | Cu | Grey. |
| 65 | 1-amino-2-methoxy-5-methylbenzene-4-β-hydroxyethylsulfone-sulfuric acid ester. | do | Cu | Brown. |
| 66 | 1-amino-2-methoxybenzene-5-β-hydroxyethylsulfone-sulfuric acid ester. | 1-(2'-chloro-5'-sulfophenyl)-3-methyl-pyrazolone 5. | Cu | Do. |
| 67 | do | 1-(2'-chloro-6'-methyl-4'-sulfopheny)-3-methyl-pyrazolone-5. | Cu | Do. |
| 68 | 1-amino-2-methoxy-5-methylbenzene-4-β-hydroxyethylsulfone-sulfuric acid ester. | do | Cu | Do. |
| 69 | 1-amino-2,5-dimethoxybenzene-4-β-hydroxyethylsulfone-sulfuric acid ester. | do | Cu | Grey. |
| 70 | 1-amino-2-methoxybenzene-5-β-hydroxyethylsulfone-sulfuric acid ester. | 1-napthol-4,8-disulfonic acid | Cu | Violet. |
| 71 | 1-amino-2-methoxy-5-methylbenzene-4-β-hydroxyethylsulfone-sulfuric acid ester. | do | Cu | Do. |
| 72 | 1-amino-2,5-dimethoxybenzene-4-β-hydroxyethylsulfone-sulfuric acid ester. | do | Cu | Navy-blue. |
| 73 | 1-amino-2-methoxybenzene-5-β-hydroxyethylsulfone-sulfuric acid ester. | 1-(4',8'-disulfo-2'-naphthyl)-3-methylpyrazolone-5. | Cu | Brown. |
| 74 | do | 1-(2'-methyl-4'-sulfophenyl)-3-carboxy-pyrazolone-5. | Cu | Do. |
| 75 | 1-amino-2-methoxy-5-methylbenzene-4-β-hydroxyethylsulfone-sulfuric acid ester. | do | Cu | Bordo. |
| 76 | 1-amino-2-methoxybenzene-5-β-hydroxyethylsulfone-sulfuric acid ester. | 1-(5',7'-disulfo-2'-naphthyl)-3-methylpyrazolone-5. | Cu | Brown. |
| 77 | 1-amino-2,5-dimethoxybenzene-4-β-hydroxyethylsulfone-sulfuric acid ester. | do | Cu | Grey. |
| 78 | 1-amino-2-methoxybenzene-5-β-hydroxyethylsulfone-sulfuric acid ester. | 1-naphthol-3,8-disulfonic acid | Cu | Violet. |
| 79 | 1-amino-2-methoxy-5-methylbenzene-4-β-hydroxyethylsulfone-sulfuric acid ester. | do | Cu | Blue. |
| 80 | 1-amino-2,5-dimethoxybenzene-4-β-hydroxyethylsulfone-sulfuric acid ester. | do | Cu | Navy-blue. |
| 81 | 1-amino-2-methoxybenzene-5-β-hydroxyethylsulfone-sulfuric acid ester. | 1-naphthol-4-sulfonic acid | Cu | Red-violet. |
| 82 | 1-amino-2-methoxy-5-methylbenzene-4-β-hydroxyethylsulfone-sulfuric acid ester. | do | Cu | Violet. |
| 83 | 1-amino-2,5-dimethoxybenzene-4-β-hydroxyethylsulfone-sulfuric acid ester. | do | Cu | Navy-blue. |
| 84 | do | 1-[(4'-N-(α-sulfoacetylamino)-phenyl]-3-methyl-pyrazolone-5. | Cu | Olive. |
| 85 | 1-amino-2-methoxy-5-methylbenzene-4-β-hydroxyethylsulfone-sulfuric acid ester. | do | Cu | Brown. |
| 86 | 1-amino-2,5-dimethoxybenzene-4-β-hydroxyethylfulfone-sulfuric acid ester. | 1-acetoacetylaminobenzene-4-β-hydroxyethyl-sulfone-sulfuric acid ester. | Cu | Olive. |
| 87 | 1-amino-2-methoxy-5-methylbenzene-4-β-hydroxyethylsulfone-sulfuric acid ester. | do | Cu | Brown. |
| 88 | 1-amino-2,5-dimethoxybenzene-4-sulfonic acid | do | Cu | Olive. |
| 89 | 1-amino-2,5-dimethoxybenzene-4-β-hydroyethylsulfone-sulfuric acid ester. | do | Cu | Do. |
| 90 | do | 1-acetoacetylamino-2,5-dimethoxybenzene-4-β-hydroxyethylsulfone-sulfuric acid ester. | Cu | Do. |
| 91 | 1-amino-2-methoxy-5-methylbenzene-4-β-hydroxyethylsulfone-thio-sulfuric acid ester. | do | Cu | Brown. |
| 92 | 1-amino-2-methoxy-5-vinylsulfonyl-benzene | do | Cu | Do. |
| 93 | 1-amino-2-methoxybenzene-5-β-chlorethyl-sulfone | 1-amino-8-naphthol-3,6-disulfonic acid | Cu | Navy-blue. |
| 94 | do | do | Cu | Do. |
| 95 | 1-amino-2-methoxybenzene-5-β-N,N-diethylaminoethylsulfone | do | Cu | Do. |
| 96 | 1-amino-2,5-dimethoxybenzene-4-β-N,N-dimethylaminoethyl-sulfone. | 1-(4'-sulfophenyl)-3-methylpyrazolone-5 | Cu | Olive. |
| 97 | 1-amino-2,5-dimethoxybenzene-4β-hydroyethylsulfone-thio-sulfuric acid ester. | do | Cu | Do |
| 98 | 1-amino-2-methoxybenzene-5-vinyl-sulfone | do | Cu | Brown. |
| 99 | 1-amino-2-methoxybenzene-5-β-hydroxyethyl-sulfone-thio-sulfuric acid ester. | 1-(4'-sulfophenyl)-3-carboxypyrazolone-5 | Cu | Do. |
| 100 | 1-amino-2-methoxybenzene-5-β-N,N-diethylaminoethylsulfone | do | Cu | Do. |
| 101 | 2-ethoxy-1-naphthylamino-6-sulfonic acid | 1-(4'-β-hydroxyethylsulfonyl-phenyl)-3-methyl-pyrazolone-5-sulfuric acid ester. | Cu | Dark brown. |
| 102 | 2-ethoxy-1-naphthylamino-7-sulfonic acid | do | Cu | Do. |
| 103 | do | 1-acetoacetylaminobenzene-4-β-hydroxyethyl-sulfone-sulfuric acid ester. | Cu | Brown-olive. |
| 104 | 1-amino-2,5-dimethoxybenzene-4-sulfonic acid | 2-(N-methyl-N-ethionylamino)-8-naphthol-6-sulfonic acid. | Cu | Blue. |
| 105 | do | 2-(N-ethionylamino)-8-naphthol-6-sulfonic acid | Cu | Do. |
| 106 | do | 2-(N-methyl-N-ethionylamino)-5-napthol-7-sulfonic acid. | Cu | Do. |
| 107 | do | 2-(N-ethionylamino)-5-naphthol-7-sulfonic acid | Cu | Do. |
| 108 | 1-amino-2,5-dimethoxybenzene-4-β-hydroxyethylsulfone-sulfuric acid ester. | 1-acetoacetylamino-4-N-methyl-N-ethionyl-aminobenzene. | Cu | Olive. |
| 109 | 1-amino-2-methoxybenzene-5-sulfonic acid | do | Cu | Brown. |
| 110 | 1-amino-2-methoxybenzene-5-N-methyl-N-ethionylaminobenzene | 1-(4'-sulfophenyl)-3-methylpyrazolone-5 | Cu | Do. |
| 111 | do | 1-amino-8-naphthol-2,4-disulfonic acid | Cu | Blue. |
| 112 | do | 1-acetamino-8-naphthol-3,6-disulfonic acid | Cu | Do. |
| 113 | 3-amino-4-methoxybenzyl-β-hydroxyethylsulfone-sulfuric acid ester. | do | Cu | Do. |

TABLE—Continued

| No. | Diazo component of the general Formula 5 | Coupling component K of the general Formulae 1 or 4 | Complex metal | Tint on cotton or wool |
|---|---|---|---|---|
| 114 | 3-amino-4-methoxybenzyl-β-hydroxyethylsulfone-sulfuric acid ester. | 1-amino-8-naphthol-2,4-disulfonic acid | Cu | Blue. |
| 115 | 1-amino-2-methoxybenzene-5-β-acetoxyethyl-sulfone | do | Cu | Do. |
| 116 | do | 1-acetamino-8-naphthol-3,6-disulfonic acid | Cu | Do. |
| 117 | 1-amino-2-methoxybenzene-5-β-hydroxyethylsulfone-methane-sulfonic acid ester. | do | Cu | Do. |
| 118 | 1-amino-2-methoxy-benzene-5-β-hydroxyethylsulfone-benzene-sulfonic acid ester. | do | Cu | Do. |
| 119 | 4,6-dinitro-2-aminophenol | 1-(4'-β-hydroxyethylsulfonylphenyl)-3-methyl-pyrazolone-5-sulfuric acid ester. | Cu | Brown. |

We claim:

1. A water-soluble disazo-dyestuff having in form of the free acid the formula

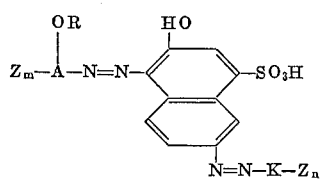

in which Z represents $-SO_2-CH=CH_2$, $-SO_2-CH_2-CH_2-O-SO_3H$ $-SO_2-CH_2-CH_2-O-SO_3-CH_3$

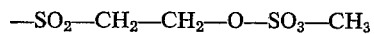

$-SO_2-CH_2-CH_2-S-SO_3H$, 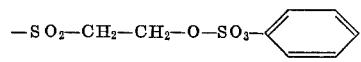

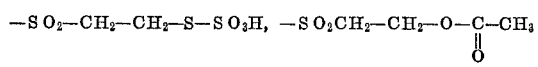

$-SO_2-CH_2-CH_2-N$ (lower alkyl)$_2$ or $-SO_2-CH_2-CH_2-Cl$

R represents hydrogen or lower alkyl, $m$ and $n$ represents integers from 0 to 2, the sum of $m$ and $n$ being at least 1 and at most 2, A represents phenylene, lower alkyl-phenylene, lower alkoxy-phenylene, sulfophenylene, lower alkyl-lower alkoxy-phenylene, di(lower alkyl) phenylene, dinitro-phenylene,

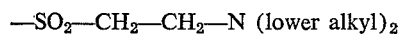

or lower alkoxy-sulfo-naphthylene, K represents 1-phenyl-3-lower alkyl-5-pyrazolone,
1-(sulfophenyl)-3-lower alkyl-5-pyrazolone,
1-phenyl-3-carboxy-5-pyrazolone,
1-(sulfophenyl)-3-carboxy-5-pyrazolone,
1-(disulfo-phenyl)-3-carboxy-pyrazolone,
1-(chloro-monosulfo-phenyl)-3-lower alkyl-5-pyrazolone,
1-(chloro-monosulfo-phenyl)-3-carboxy-5-pyrazolone,
1-(dichloro-monosulfo-phenyl)-3-lower alkyl-5-pyrazolone,
1-[N-(α-sulfoacetylamino)-phenyl]-3-lower alkyl-5-pyrazolone,
1-(lower alkylchloro-monosulfo-phenyl)-3-lower alkyl-5-pyrazolone,
1-(disulfo-naphthyl)-3-lower alkyl-5-pyrazolone, or the 1:1 copper complex compound or the 1:2-cobalt- or 1:2-chromium complex compound thereof.

2. The dyestuff of the formula

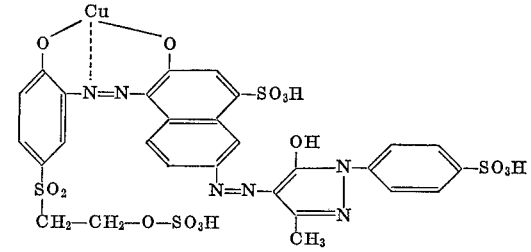

3. The dyestuff of the formula

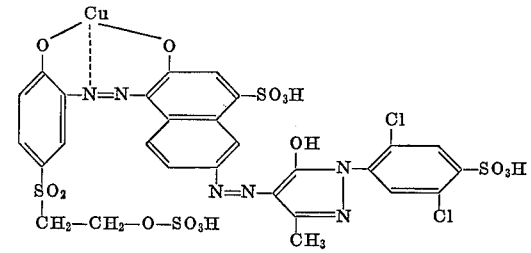

4. The dyestuff of the formula

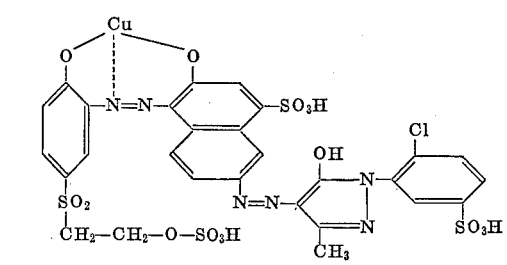

5. The dyestuff of the formula

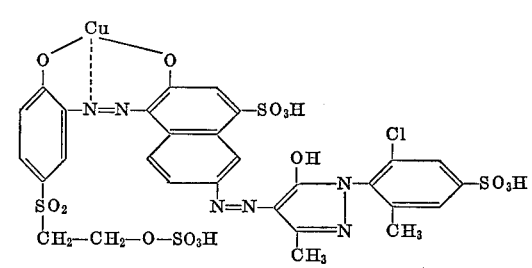

6. The dyestuff of the formula
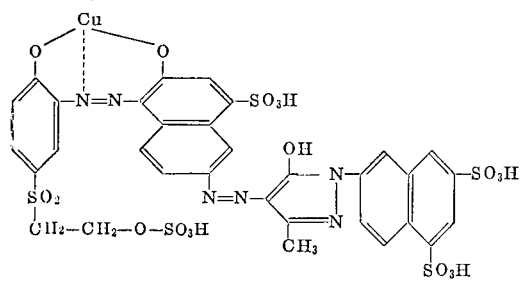
References Cited
UNITED STATES PATENTS
| | | | |
|---|---|---|---|
| 3,380,989 | 4/1968 | Remy | 260—148 |
| 3,440,240 | 4/1969 | Kuhne et al. | 260—190 X |
| 3,457,251 | 7/1969 | Meininger | 260—148 |
| 3,457,252 | 7/1969 | Meininger | 260—148 |
FLOYD DALE HIGEL, Primary Examiner
U.S. Cl. X.R.
8—4, 41 R, 41 B, 42 R, 42 B, 43, 50, 51, 63, 71; 260—148, 160, 162, 163, 176, 189, 190, 191, 193, 195